US012629960B2

(12) United States Patent
Brankov et al.

(10) Patent No.: US 12,629,960 B2
(45) **Date of Patent: *May 19, 2026**

(54) DIGITAL EMBOSSING OF DECORATIVE SURFACE COVERINGS

(71) Applicant: TARKETT GDL, Lentzweiler (LU)

(72) Inventors: Igor Brankov, Wiltz (LU); Christophe Maertens, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 32 days.

This patent is subject to a terminal disclaimer.

(21) Appl. No.: 18/035,772

(22) PCT Filed: Nov. 17, 2021

(86) PCT No.: PCT/EP2021/081980

§ 371 (c)(1),
(2) Date: May 8, 2023

(87) PCT Pub. No.: WO2022/106466

PCT Pub. Date: May 27, 2022

(65) Prior Publication Data

US 2023/0406033 A1 Dec. 21, 2023

(30) Foreign Application Priority Data

Nov. 23, 2020 (LU) ....................................... 102233

(51) Int. Cl.
*B44C 5/00* (2006.01)
*B44C 1/24* (2006.01)
(Continued)

(52) U.S. Cl.
CPC .............. *B44C 5/0461* (2013.01); *B44C 1/24* (2013.01); *B44C 3/025* (2013.01)

(58) Field of Classification Search
CPC ....... B44C 5/00; B44C 5/0446; B44C 5/0461; B44C 5/0492; B44C 1/24; B44C 3/00; B44C 3/025
See application file for complete search history.

(56) References Cited

U.S. PATENT DOCUMENTS 8,099,919 B2 * 1/2012 Garcia ...................... B32B 3/06 52/311.2
9,994,010 B2 * 6/2018 Pervan ................ C09D 11/322
(Continued)

FOREIGN PATENT DOCUMENTS

DE 102008051211 A1 4/2010
DE 102010036454 A1 1/2012
(Continued)

OTHER PUBLICATIONS

International Search Report for corresponding application PCT/EP2021/081980 filed Nov. 17, 2021; Mail date Jun. 24, 2022.
(Continued)

*Primary Examiner* — Chi Q Nguyen
(74) *Attorney, Agent, or Firm* — CANTOR COLBURN LLP

(57) ABSTRACT

A method for producing a decorative surface covering comprises providing a structural core, including one or more core layers, the structural core carrying a décor layer representing a two-dimensional décor, and generating a three-dimensional surface relief by digitally embossing, in register with the two-dimensional décor, where the three-dimensional surface relief is generated at a distance of at least 0.1 mm from the décor layer by applying a transparent or at least translucent spacer layer against the décor layer, the spacer layer having a thickness that remains unmodified by the digital embossing and that corresponds to the distance, and where the three-dimensional surface relief is generated in one or more coating layers on a side of the spacer layer
(Continued)

facing away from the décor layer after application of the spacer layer against the décor layer.

20 Claims, 5 Drawing Sheets

(51) Int. Cl.
*B44C 3/02* (2006.01)
*B44C 5/04* (2006.01)

(56) References Cited

U.S. PATENT DOCUMENTS

| | | | | |
|---|---|---|---|---|
| 12,109,790 | B1* | 10/2024 | Drevet | B32B 27/40 |
| 2010/0294015 | A1* | 11/2010 | Fahrenbach | B44B 5/009 72/414 |
| 2013/0092314 | A1* | 4/2013 | Ziegler | B29C 43/021 156/220 |
| 2013/0327471 | A1* | 12/2013 | Hedley | B44C 1/24 156/219 |
| 2015/0000822 | A1* | 1/2015 | Barsalov | B29C 65/0618 156/580 |
| 2017/0008334 | A1* | 1/2017 | Hoff | B44C 1/24 |
| 2023/0070994 | A1* | 3/2023 | Odum | B41J 25/308 |
| 2023/0115964 | A1* | 4/2023 | Weck | B21D 37/20 72/373 |
| 2023/0382156 | A1* | 11/2023 | Miyazaki | B32B 7/12 |
| 2023/0406033 | A1* | 12/2023 | Brankow | B44C 5/04 |
| 2025/0010656 | A1* | 1/2025 | Gourdin | B44C 5/04 |

FOREIGN PATENT DOCUMENTS

| | | | |
|---|---|---|---|
| EP | 2080629 | A2 | 7/2009 |
| EP | 2886366 | A1 | 6/2015 |
| IT | 201800008133 | A1 | 2/2020 |
| WO | 2017046309 | A1 | 3/2017 |
| WO | 2020089491 | A1 | 5/2020 |

OTHER PUBLICATIONS

Written Opinion for corresponding application PCT/EP2021/081980 filed Nov. 17, 2021; Mail date Jun. 24, 2022.

* cited by examiner

DIGITAL EMBOSSING OF DECORATIVE SURFACE COVERINGS

FIELD OF THE INVENTION

The invention generally relates to the field of finishing materials for constructions, in particular to decorative surface coverings such as, for instance, floorings, wallcoverings or ceiling coverings.

BACKGROUND OF THE INVENTION

Decorative surface coverings such as flooring, wallcovering or ceiling covering, may be of the so-called homogeneous or heterogeneous types. A homogeneous surface covering has essentially the same composition throughout its thickness (except maybe for a topcoat and/or a textile backing), whereas a heterogeneous surface covering comprises a stack of layers which differ in their functions and compositions. A typical layer structure of a heterogeneous surface covering comprises a backing layer, one or more core layers, a décor layer, a protective wear layer and a topcoat.

The décor layer may be a thin layer of a natural material, e.g. cork or wood, but may also comprise a printed décor, imitating or not a natural material. In order to improve the realism of a printed décor imitating a natural material, such as wood, cork, stone, etc., the surface covering may be given a surface structure by embossing. Mechanical embossing involves pressing an embossing plate or cylinder against the surface covering under high temperature so as to transfer the three-dimensional pattern of the embossing plate or cylinder into the surface covering. In high-quality surface coverings, the embossing is carried out in register with the printed décor.

WO 2017/046309 A1 discloses a base panel suitable to be processed into a covering panel, consisting of: (i) a substrate having a top surface, (ii) a resilient layer having a top surface and a bottom surface, the bottom surface being connected to the top surface of the substrate, and (iii) optionally, a contact layer between the bottom surface of the resilient layer and the top surface of the substrate. The covering panel comprises a digitally printed décor on the top surface of the resilient layer of the base panel. The covering panel may further be provided with an embossing pattern, which may be applied in register with the print, so as to accentuate the appearance of the décor.

Digitally printed décors are gaining in importance, in particular (but not only) due to the fact that designs can be changed more quickly and at much lower costs than with conventional printing techniques, such as, e.g. heliogravure printing. This allows the industry to react more flexibly to changing market demands and to reduce product development costs.

SUMMARY OF THE INVENTION

According to a first aspect of the invention, a method for producing a decorative surface covering comprises:

- providing a structural core, including one or more core layers, the structural core carrying a décor layer representing a two-dimensional décor;
- generating a three-dimensional surface relief by digitally embossing, in register with the two-dimensional décor.

The three-dimensional surface relief is generated at a distance of at least 0.1 mm, preferably at least 0.15 mm, more preferably at least 0.3 mm, still more preferably at least 0.4 mm, yet more preferably 0.5 mm, from the décor layer by applying a transparent or at least translucent spacer layer against the décor layer, the spacer layer having a thickness that remains unmodified by the digital embossing and that corresponds to the distance. The three-dimensional surface relief is generated in one or more coating layers on a side of the spacer layer facing away from the décor layer after application of the spacer layer against the décor layer.

The expressions “décor” and “decorative” are used herein to indicate that the corresponding layer or surface remains visible in the final surface covering product when in use as intended and contributes to the outer appearance of the surface covering. The two-dimensional décor is, preferably, at least one-dimensionally patterned, “at least one-dimensionally patterned” meaning that there are colour or shade variations (preferably including plural gradients and/or steps) of the décor along at least one direction, the variation being noticeable to the naked human eye. More preferably, the décor has such variations in two mutually perpendicular directions.

The expression “three-dimensional surface relief” designates the deviations from a perfectly flat surface imparted by digital embossing. It will be understood that the scale of the three-dimensional surface relief is greater than the scale of the material-intrinsic surface texture (surface roughness and waviness).

“Digital embossing” designates a technique to a impart a three-dimensional surface relief to a surface in accordance with digital data provided to the digital embossing equipment. Various digital embossing techniques may be envisaged in the context of the invention. The embossing depth, i.e. the (maximum) amplitude of the thickness variations of the layer wherein the surface relief is realized, preferably ranges from 50 μm to 300 μm, but greater embossing depths are possible, e.g. from 50 μm to 500 μm or even more.

For instance, the digital embossing may include:

- applying a coating layer on the side of the spacer layer facing away from the décor layer,
- providing a negative of at least part of the three-dimensional surface relief by digital 3D printing of an embossing tool (this could include, e.g., digital 3D printing of the negative on a cylinder, a plate or a belt, so as to form a temporary embossing tool),
- pressing the 3D-printed embossing tool against the coating layer so as to form therein at least the part of the three-dimensional surface relief, and
- fixing the three-dimensional surface relief in the coating layer.

As used herein, “digital printing” means a digitally (computer-) controlled deposition and immobilization of material (e.g. pigment or dye ink, water or solvent based) in predefined patterns onto a surface. “Digital 3D printing” refers to such a process, wherein the deposited material is solidified to create a three-dimensional pattern, which is raised with respect to the surface on which is printed.

The embossing tool created by digital 3D printing may be reused when plural copies of the three-dimensional surface relief need be made. Alternatively, the embossing tool may be cleared after single use, by removing (e.g. by scraping off) the negative.

Alternatively or additionally, the digital embossing could include: applying a thickness-modulated coating on the side of the spacer layer facing away from the décor layer by digital additive 3D printing. The thickness-modulated coating could comprise plural coating layers, each layer corresponding to a specific height interval and the borders of each layer are like contour lines of loci of points having the same height above the spacer layer.

Alternatively or additionally, the digital embossing could include:

- applying a coating layer on the side of the spacer layer facing away from the décor layer,
- applying an inhibiting agent in a pattern onto, into or below the coating layer by digital printing,
- solidifying the coating layer, the inhibiting agent inhibiting the solidification in the pattern, and
- removing unsolidified parts of the coating layer (and the inhibiting agent).

Such an inhibiting agent could be a solvent for the coating, which locally dilutes the coating and thereby delays the solidification of the coating in the pattern in comparison with the rest of the coating layer. Alternatively or additionally, the inhibiting agent could interfere with the solidification principle by locally absorbing all or part of the energy provided for the solidification. For instance, if radiation is used to cure the coating, a corresponding radiation-absorber could be applied. The pattern of inhibiting agent (which could e.g. be a UV absorber or UV stabilizer in case of UV-curing) would in this case have the effect of a mask reducing and/or preventing the deposit of energy in the coating layer and thereby inhibiting the curing thereof.

Alternatively or additionally, the digital embossing could include:

- applying a coating layer on the side of the spacer layer facing away from the décor layer,
- applying a coating-repellent agent, into or below the coating layer by digital printing so as to create in the coating layer a pattern (the pattern of the coating being complementary to the pattern of the coating-repellent agent).
- solidifying the coating layer, and
- removing the coating-repellent agent.

The coating-repellent agent and the coating could be immiscible liquids. Alternatively, the pattern of coating repellent agent could be applied as a temporary layer before application of the coating layer.

Removal of unsolidified parts of the coating layer, inhibiting agent and/or coating-repellent agent could be done by brushing, blowing (e.g. using an air knife or the like)), scraping, selective dissolution, suction by vacuum, etc.

The digital embossing process could include plural applications of coating (layers) according to the described methods.

The method for producing a decorative surface covering may further include:

- generating three-dimensional surface relief data by calculating a three-dimensional surface relief based on a determined décor type (the décor type may be determined from user input or be obtained by matching the décor against a stored collection of décor types, using a classifier), lineal and areal features of the two-dimensional décor, and the distance, the three-dimensional surface relief file defining raised and/or lowered areas with respect to a reference level, the reference level being coincident with the side of the spacer layer facing away from the décor layer or separated therefrom by a known spacing;
- providing the 3D surface texture data to a digital embossing equipment carrying out the digital embossing, the digital embossing equipment reading the 3D surface texture data and carrying out the digitally embossing in accordance with the 3D surface texture data.

The three-dimensional surface relief data may be provided to the digital embossing equipment in any suitable format, e.g. as a file, a set of files, a stream, data packets, etc., in accordance with the specifications (API) of the digital embossing equipment.

Preferably, the thickness of the spacer layer (and, thus, the distance) amounts to 0.15 mm or more.

The spacer layer could be laminated with the structural core carrying the décor layer prior to the three-dimensional surface relief generation. Alternatively or additionally, the spacer layer (or a sublayer thereof) could be produced by coating the structural core (or a sub-layer of the spacer layer previously placed thereon) with a plastisol, which is thereafter solidified.

The spacer layer could be attached to the structural core carrying the décor layer with hot melt glue, solvent-based glue, heat-sensitive glue and/or pressure-sensitive glue and/or any material which provides adhesion between the spacer layer and the structural core of 50 N/5 cm or more according to EN ISO 10582.

The spacer layer preferably comprises or consists of a polyethylene terephthalate polymer, a polyethylene polymer, a polypropylene polymer, or a polyvinyl chloride polymer. The spacer layer preferably qualifies as a wear layer. More preferably, such wear layer is according to EN ISO 10582 and ASTM F3261 (i.e. as a "portion of a resilient floor covering that contains or protects the pattern and design exclusive of factory finishes or maintenance coatings").

When the decorative surface covering is a floor covering, it preferably belongs to the following categories (classes) according to ISO 10874, implying, in particular that the wear layer has a certain minimum thickness:

a. Domestic Use

| Class | min. PVC wear layer thickness |
|---|---|
| Class 21 | 0.15 mm |
| Class 22 and 22+ | 0.2 mm |
| Class 23 | 0.3 mm |

b. Commercial Use

| Class | min. PVC wear layer thickness |
|---|---|
| Class 31 | 0.3 mm |
| Class 32 | 0.4 mm |
| Class 33 | 0.55 mm |
| Class 34 | 0.7 mm |

c. Light Industrial Use

| Class | min. PVC wear layer thickness |
|---|---|
| Class 41 | 0.4 mm |
| Class 42 | 0.55 mm |
| Class 43 | 0.7 mm |

The structural core preferably comprises a printable surface. The method preferably includes digitally printing the décor layer onto the printable surface of the structural core prior to application of the spacer layer against the décor layer. While the printable surface is preferably an integral part of the core structure, alternatively, it could be a separate printing substrate (e.g. printing paper) that is attached to the core structure (before or after printing). The printable surface needs to be compatible with the inks used for digitally printing the décor layer in terms of surface roughness, surface tension, and chemical functionalities present on the surface. When the structural core comprises the printable surface, such a stack of layers may be advantageously obtained by co-extrusion.

Preferably, individual slabs of the structural core are provided, and the digital embossing is carried out slab-by-slab, registration of the three-dimensional surface relief with the two-dimensional décor being effected by taking registration marks and/or one or more borders of the slabs as references.

In the present document, the verb "comprise" and the expression "comprised of" are used as open transitional phrases meaning "consist at least of" or "include". The term "layer" designates one among plural sheets or thicknesses of material that make up the surface covering. Plural similar sheets or thicknesses assembled on top of one another could be considered a complex layer, provided that the assembly forms a functional unit. For instance, the spacer layer could consist of a single sheet or a stack of sublayers.

BRIEF DESCRIPTION OF THE DRAWINGS

By way of example, preferred, non-limiting embodiments of the invention will now be described in detail with reference to the accompanying drawings, in which.

The accompanying drawings illustrate several aspects of the present invention and, together with the detailed description, serve to explain the principles thereof. In the drawings.

DETAILED DESCRIPTION OF ONE OR MORE PREFERRED EMBODIMENTS

It will be understood that the following description and the drawings to which it refers describe by way of example several embodiments of the proposed invention for illustration purposes. This description of preferred embodiments shall not limit the scope, nature or spirit of the claimed subject matter. The skilled person will appreciate that features of the different embodiments may be combined into further embodiments without departing from the scope of the present invention.

Figure 1:
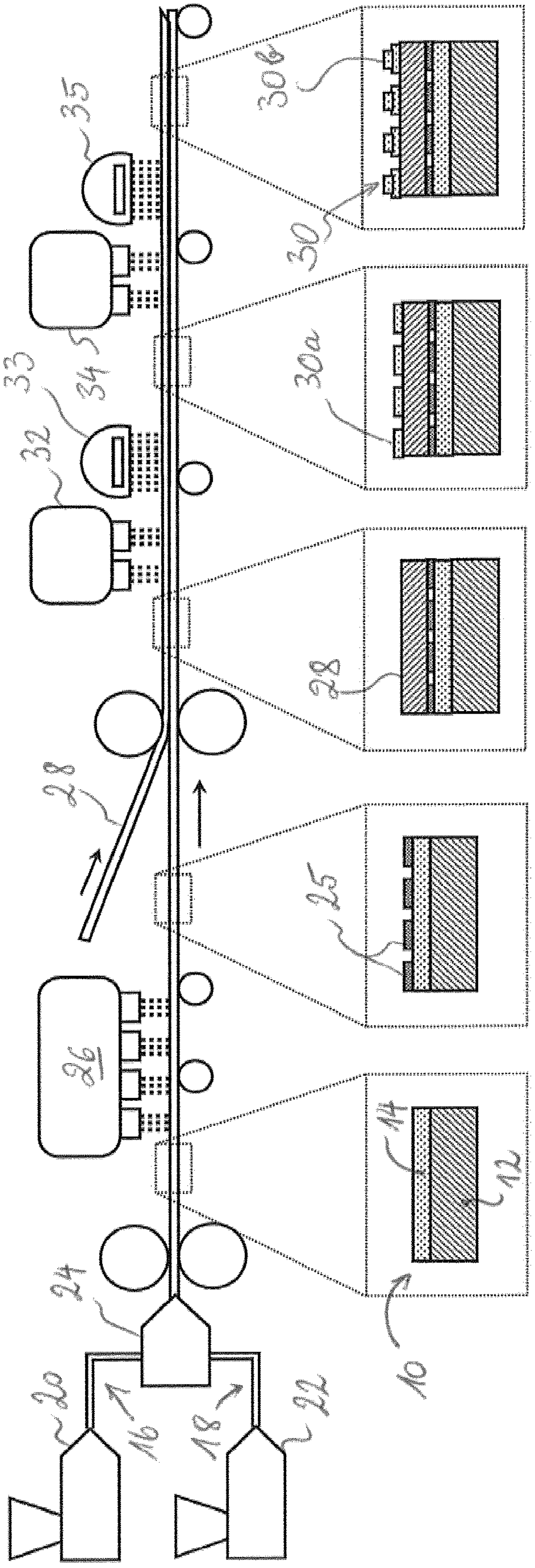
FIG. 1: is a schematic illustration of a production line for implementing a method of producing a decorative surface covering according to a first embodiment of the invention.

FIG. 1 illustrates a first embodiment of the proposed method for producing a decorative surface covering. A multilayer printing substrate is provided in the form of a structural core (also: core structure) 10 comprising a support layer 12 coextruded with a printable layer (hereinafter: décor-carrying layer) 14. Thermoplastic melt streams 16, 18 are guided from respective extruders 20, 22 to the co-extrusion die 24, where the core structure 10 is formed. The support layer 12 is illustrated in this example as a monolayer for simplicity and the skilled person will understand that it could be replaced by a multilayer structure, provided that a suitable multi-manifold die is used instead of a two-manifold die.

Downstream of the co-extrusion die 24, a two-dimensional décor 25 is digitally printed on the décor carrying layer 14 of the core structure 10 using digital printing equipment 26, which includes, preferably, an industrial printer.

The digital printing equipment preferably comprises printheads that project ink droplets onto the décor-carrying layer 14 in a very precise manner, in terms of position and volume of the droplets.

Digital printing equipment 26 preferably comprises a Single-Pass industrial printer, which uses several printheads aligned side by side in several rows that cover the width of printing substrate. Each row of printhead may prints one or more colours. During the printing process, the printing substrate proceeds in the machine direction under the printheads. Digital printing equipment 26 may be custom-made for the application in accordance with the requirements in terms of capacity and print quality. Digital printing equipment 26 could use thermal printhead technology, wherein a current pulse passing through a heating element vaporizes a tiny quantity of ink in a chamber so as to form a bubble, and this bubble propels an ink droplet through the printhead nozzle onto the printing substrate. Digital printing equipment 26 could also use piezoelectric printheads, wherein a piezoelectric element, on application of a voltage, generates a pressure pulse that drives an ink droplet through the nozzle. The ink is chosen in accordance with the printhead technology, the printing substrate, the subsequent processing steps as well as quality and price constraints.

Various types of ink could be used in implementations of the method. Inks typically comprise one or more colorants, a binder that bonds the colorants to the surface and a carrier liquid. Colorants comprise dyes or pigments or a combination of both. Pigments are solid colorant particles that are suspended or dispersed throughout the carrier liquid. Pigment-based inks may be more lightstable and more fade-resistant than dye-based inks. Furthermore, dye-based inks often comprise organic solvents which may lead to higher VOC emissions than pigment-based inks, especially when water is the carrier liquid of the latter. Carrier liquids may include solvents, oil(s), water and polymeric resins. For certain surface coverings, radiation-curable inks may be considered as particularly advantageous.

The printing equipment 26 may comprise a drying or curing stage (not shown in FIG. 1), wherein the printed décor 25 is solidified and bonded to the décor-carrying layer 14. Such drying or curing stage could comprise one or more heaters and/or one or more blowers and/or one or more radiation sources, depending of the type of ink used by the printing equipment 26. Drying/curing prior to application of the spacer layer 28 may be particularly recommended if the ink includes non-reactive solvent(s) or carrier(s), which can no longer be efficiently eliminated or reacted after the printed décor 25 has become sandwiched between its substrate and the spacer layer.

After application of the printed décor, the structural core is contacted with the spacer layer 28. The spacer layer 28 is transparent (or at least translucent) and could be applied to the core structure by hot lamination. If hot lamination, typically taking place at temperatures above 150° C., is used, the inks selected in the preceding décor printing step are selected such that they can withstand the high temperatures of the hot lamination. As an alternative to hot lamination, a "cold" lamination technique could be employed, using a pressure-sensitive adhesive, or a radiation-curable adhesive. The lamination could in this case be carried out at ambient temperature—without excluding that the adhesive heats up under pressure or during the curing when the reactions induced by the radiation are exothermic. This implies that the constraints on the composition of the inks and the spacer layer could be somewhat relaxed on certain aspects if the method of the invention is used: for instance, the spacer layer could be one free from plasticizer or one containing plasticizer.

An electron-beam-curable polyurethane (PU) and/or acrylate composition, preferably free (or at least substantially free) from any photoinitiator, could be used as a radiation-curable adhesive. The core structure 10 and the spacer layer 28 could be attached to each other by electron-beam curing the adhesive between them. It is not excluded that the inks used for the décor layer 25 may serve as adhesive for the purpose of attaching the spacer layer 28 to the structural core 10. Electron-beam curing would be carried out with an electron beam curing machine. Upon curing, the adhesive takes the role of a tie layer firmly anchored to both the spacer layer 28 and the structural core 10.

After application of the spacer layer 28 on the décor layer 25, a digital embossing step is carried out. It will be understood that different digital embossing techniques are contemplated. Although the illustrated embodiments are preferred embodiments of the invention, digital embossing techniques could be exchanged between them. In the embodiment illustrated in FIG. 1, digital embossing is implemented as digital 3D (layer-by-layer) printing of a relief 30 on top of the spacer layer 28. To print the relief 30, a transparent or at least translucent radiation-curable (e.g. UV- or electron-beam-curable) composition, compatible with the spacer layer 28 is preferably used. In the illustrated embodiment, the relief 30 is built up from multiple individual printed topcoat layers 30*a*, 30*b*, applied one after the other, in register with the previously printed décor 25. In the illustrative example of FIG. 1, first 30*a* and second 30*b* layers of a polyurethane topcoat are printed, one after the other, on the spacer layer 28. The 3D printing is carried out using digital printers 32 and 34. After a printing stage, the newly deposited layer(s) of topcoat may be cured or precured in order to prepare these layer(s) for the deposition of further layer(s) of topcoat thereon. In the illustrated embodiment, intermediate curing of the topcoat layer 30*a* is effected with (radiation-) curing machine 33 located downstream of printer 32 and the final curing is effected with (radiation-) curing machine 35 located downstream of printer 34. In case of a radiation-curable topcoat, the radiation dose applied during the final curing is chosen such that complete curing of all topcoat layers 30*a*, 30*b* is achieved. Although FIG. 1 does not show it, the topcoat may comprise one or more continuous layers, so as to completely seal off the underlying spacer layer 30 (and any intermediary topcoat layers). That remark is also valid for the embodiments described further below.

The printing of the topcoat layers 30*a*, 30*b* is carried out in register with the two-dimensional décor 25. To achieve this, registration marks can be applied on the printing substrate when the two-dimensional décor 25 is printed. These registration marks can then be used in the production stages downstream, in particular in the digital embossing stage.

Figure 2:
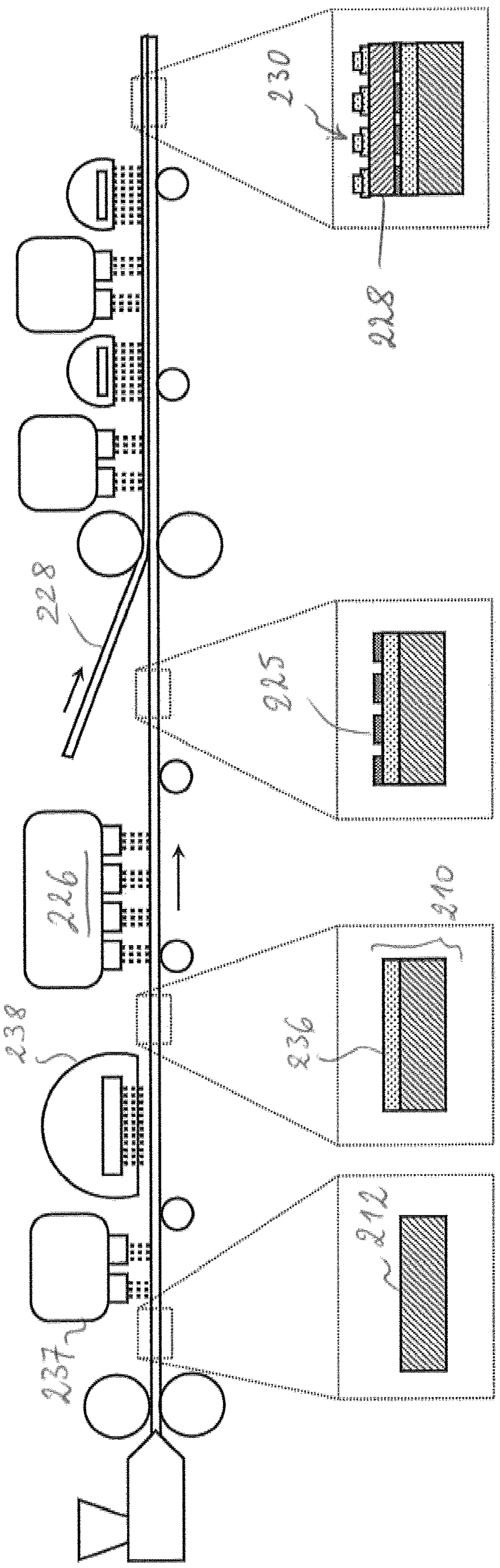
FIG. 2: is a schematic illustration of a production line for implementing a method of producing a decorative surface covering according to a second embodiment of the invention.

FIG. 2 illustrates a second embodiment of the proposed method for producing a decorative surface covering, which differs from the previously discussed embodiment by the way the structural core is produced. In the example of FIG. 2, a support layer 212 is provided with a primer layer 236 applied on top thereof by a primer application stage. The support layer 212 and the primer layer 236 together form a structural core 210 capable of receiving a two-dimensional décor 225.

The primer application stage may comprise a coating apparatus or, as illustrated, a printer 237 and a curing apparatus 238. The printer 237 may be a digital printer but any other printing technique suitable for homogeneously applying the primer layer 236 could be used. When the primer layer 236 has been applied, it is preferably cured using a curing apparatus 238 that uses a curing technique (e.g. heating, radiation-curing) that is compatible with the primer composition employed.

Downstream of curing apparatus 238, the two-dimensional décor 225 is digitally printed on the structural core 210 using digital printing equipment 226.

After the printing of the décor 225, the structural core 210 is laminated with the spacer layer 228, and after application of the spacer layer 228 on the décor layer 225, a digital embossing step is carried out so as to generate a three-dimensional relief 230 in register with the décor 225. These steps may be carried out as described previously for the embodiment of FIG. 1.

Figure 3:
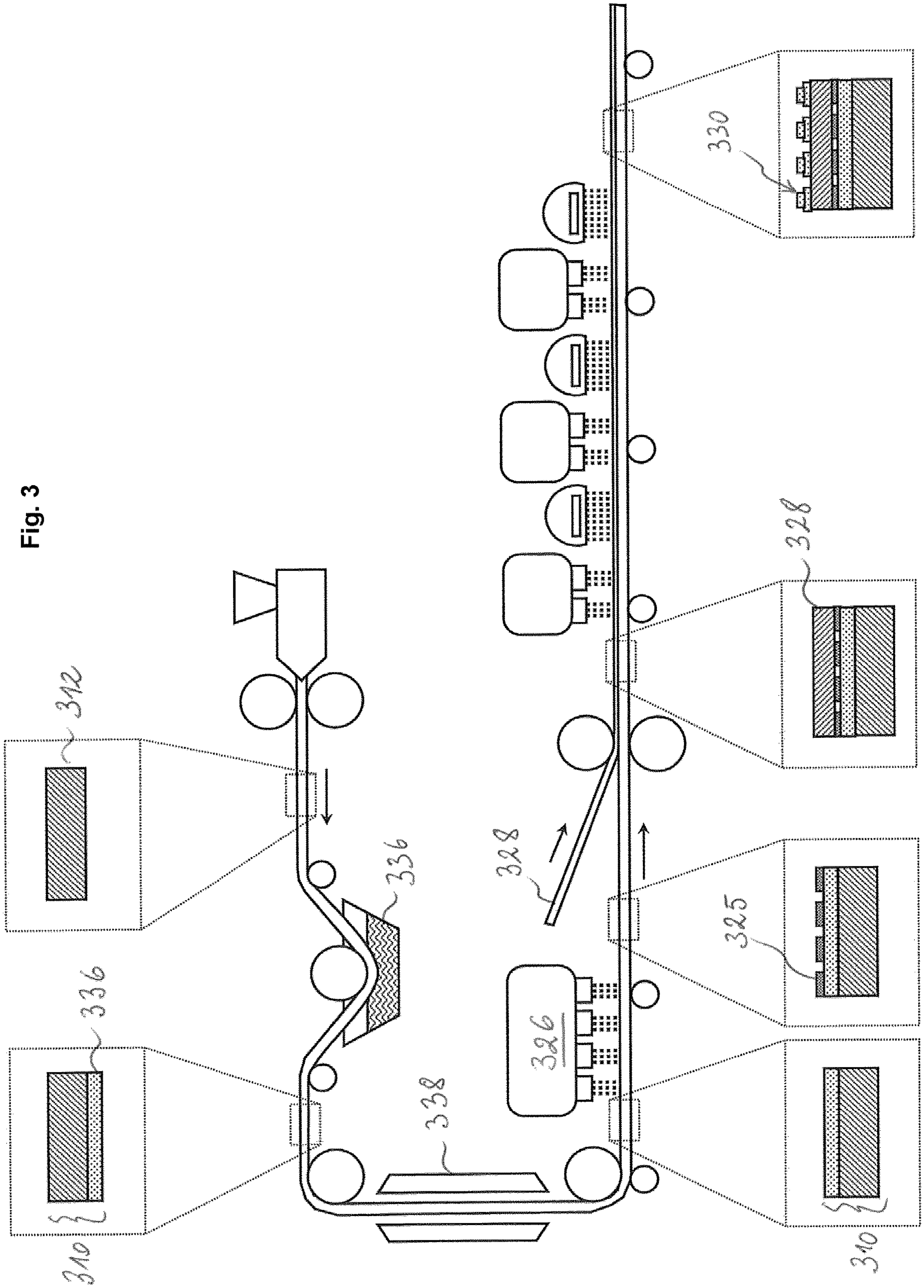
FIG. 3: is a schematic illustration of a production line for implementing a method of producing a decorative surface covering according to a third embodiment of the invention.

FIG. 3 illustrates a third embodiment of the proposed method for producing a decorative surface covering, which differs from the previously discussed embodiments only by the way the structural core is produced. In the example of FIG. 3, a structural core 310 is provided by applying a primer layer 336 on a support layer 312. The primer is applied in liquid state (e.g. as a plastisol) by guiding the support layer 312 through a bath 336 of primer liquid, which is thereafter solidified with drying/heating device 338.

The two-dimensional décor 225 is digitally printed on the structural core 310 using digital printing equipment 326.

After the printing of the décor 325, the structural core 310 is laminated with the spacer layer 328, and after application of the spacer layer 328 on the décor layer 325, a digital embossing step is carried out so as to generate a three-dimensional relief 330 in register with the décor 325. These steps may be carried out as described previously for the embodiment of FIG. 1.

The support layer 212, 312 is illustrated in FIGS. 2 and 3 as a monolayer provided by an extruder. It will be appreciated that the support layer could be a multilayer structure, provided that an appropriate extrusion system is used.

Figure 4:
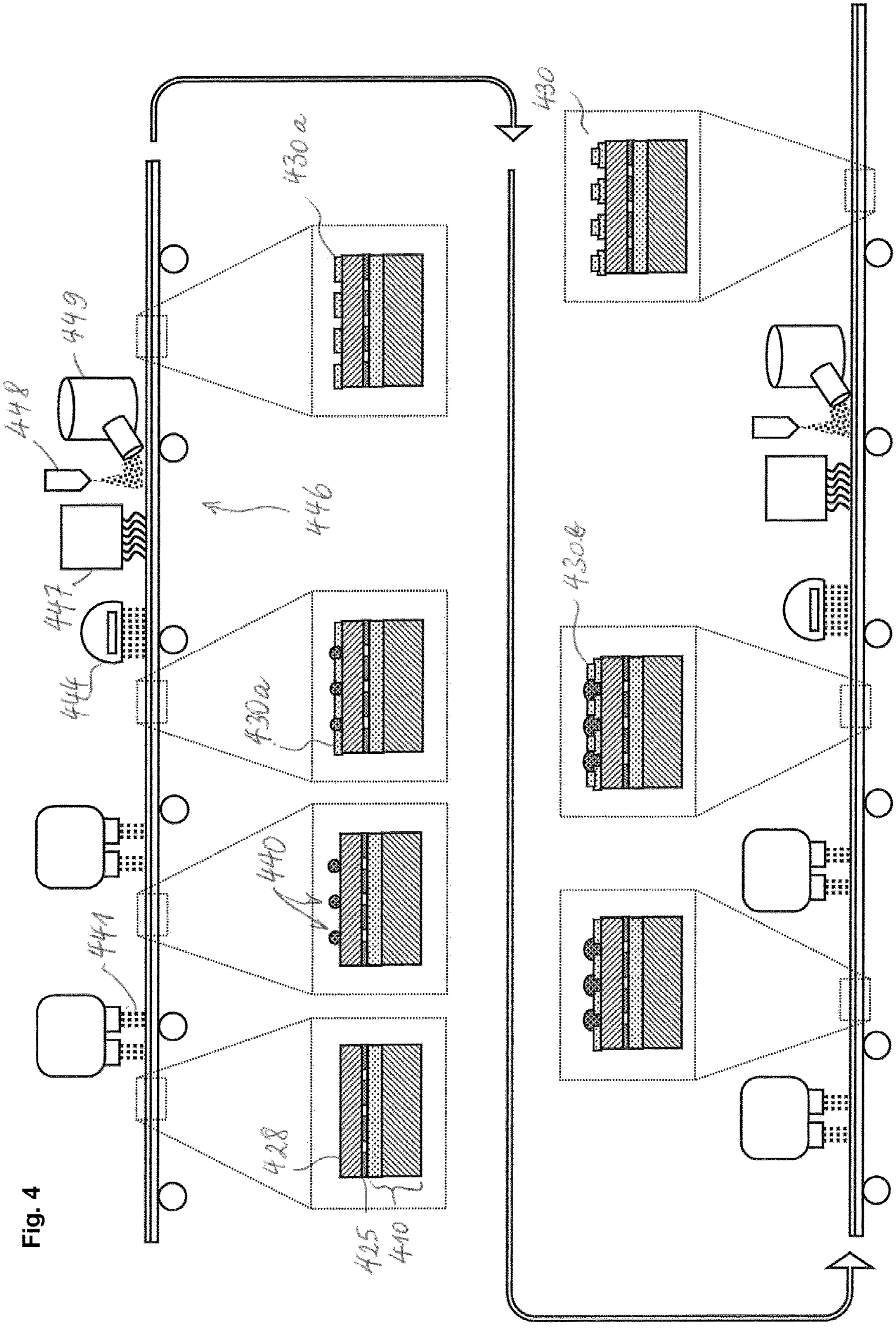
FIG. 4: illustrates a possible way of applying a relief on a decorative surface covering.

FIG. 4 illustrates the digital embossing of a relief 430 on top of the spacer layer 428 using a different technique than in the previously described embodiments. The relief 430 is built up from multiple individual print layers, applied in register one after the other. In FIG. 4, the spacer layer 428 is already present on the structural core 410 that carries a two-dimensional décor 425.

The digital embossing-in-register comprises, as a first step, application of a "mask pattern" 440 by digital printing, in register with the décor 425, a coating repellent agent or a solidification-inhibiting agent 441. A first topcoat layer 430*a* is then applied. Application of the topcoat layer 430*a* may also be done by digital printing. Alternative coating techniques are possible.

When the composition of the mask pattern is a coating repellent agent, the combination of coating repellent agent and topcoat material is selected such that the coating repellent agent repels the topcoat material and prevents the topcoat material from entering (or remaining in) the zones covered with the mask pattern. When the composition of the mask pattern is an solidification-inhibiting agent, the combination of solidification-inhibiting agent and topcoat material is selected such that the solidification-inhibiting agent delays or prevents solidification of the topcoat material in the zones covered with the mask pattern. The first layer of topcoat 430*a* is thereafter solidified (e.g. cured, fused and/or dried) using a solidification apparatus 444.

Cleaning equipment 446 thereafter removes the mask pattern and/or unsolidified residues of the first topcoat material. In the illustrated example, cleaning equipment 446 includes a brush 447, which loosens the mask pattern/residues by mechanical friction, a blower 448 (e.g. an air knife) and a vacuum cleaner 449. Different combinations of cleaning devices are possible.

After removal of the mask pattern and/or unsolidified residues, one or more further topcoat layers 430*b* may be applied in the same way as the first topcoat layer 430*a*.

Figure 5:
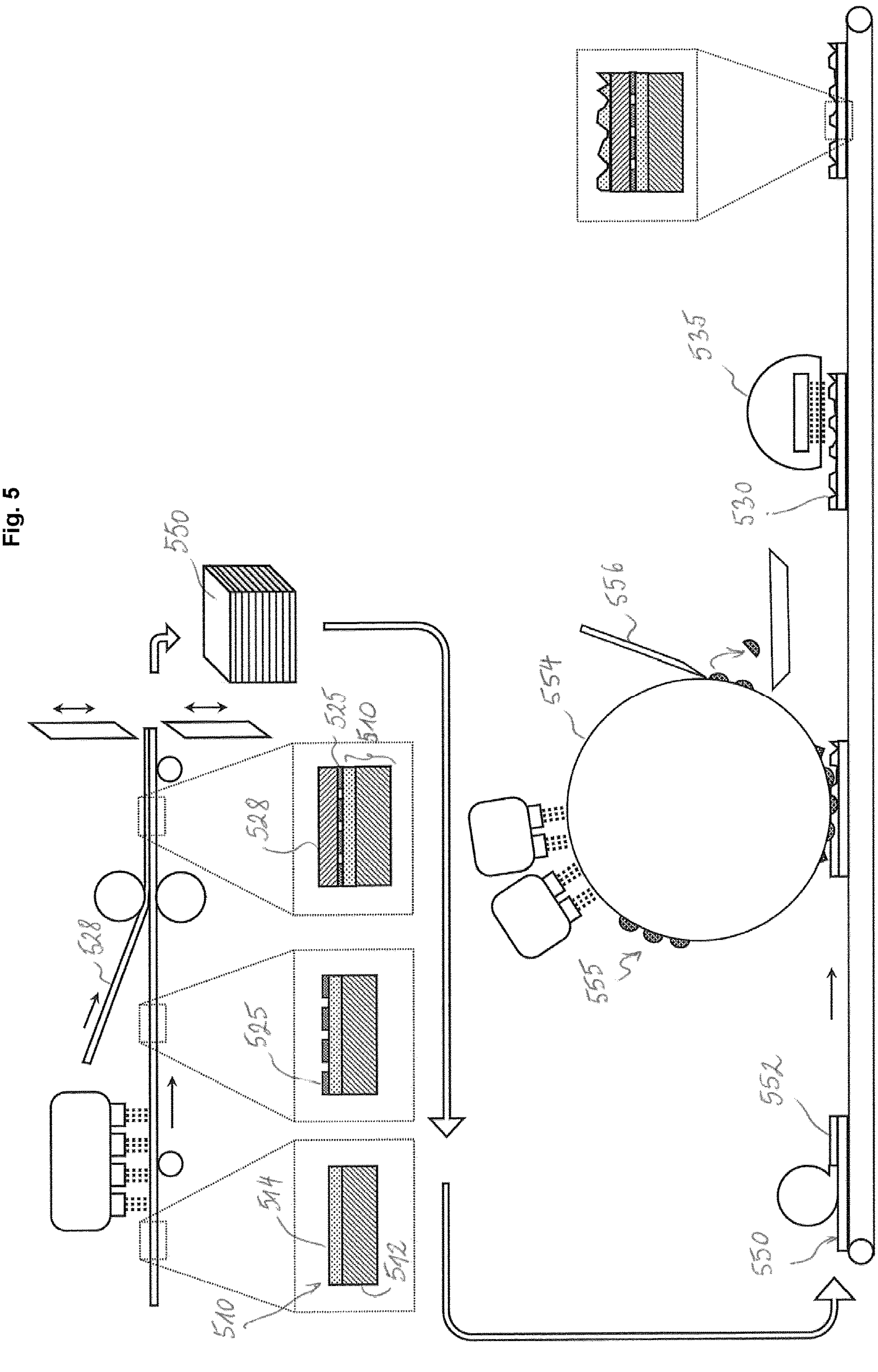
FIG. 5: is a schematic illustration of a production line for implementing a method of producing a surface floor covering according to a fourth embodiment of the invention.

FIG. 5 illustrates yet a further embodiment of the proposed method for producing a decorative surface covering.

First, a structural core 510 (including one or more support layers 512 and a décor-receiving layer 514) receives a digitally printed two-dimensional décor 525, before a spacer layer 528 is laminated with the structural core 510. The layer assembly thus formed is cut into slabs 550.

The slabs 550 are input into a digital embossing equipment, wherein a coating layer 552 is applied on the side of the spacer layer 528 that faces away from the décor layer. An embossing tool is created by digital 3D printing of a negative 555 of the desired three-dimensional surface relief 530. In the illustrated embodiment, the negative 555 is 3D printed on the surface of a cylinder 554, which is pressed against the slabs 550 so as to emboss the digitally printed surface structure into the coating layer 552. The angular speed of the cylinder 554 is controlled such that the contact between the cylinder 554 and the slabs 550 takes place essentially without slippage. It is worthwhile noting that the embossing tool could alternatively by created by digital 3D printing of a negative 555 of the desired three-dimensional surface relief 530 on a plate or a die.

The relief 530 is thereafter fixed in the coating layer by solidification of the latter (this may include fusion, drying and/or curing, depending on the type of coating composition). In the example of FIG. 5, solidification is carried out using a radiation-curing device 535.

The negative(s) 555 on the cylinder 554 could serve plural times if they are not damaged by the embossing. It will be appreciated, however, that for each slap, a different negative could be generated on-the-fly. This makes it possible to create surface coverings with unique designs (décor and corresponding embossing). Negatives may be removed from the cylinder using a scraper or knife 556. The material of the negatives could be recycled.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for producing a decorative surface covering, the method comprising:

providing a structural core, including one or more core layers, the structural core carrying a décor layer representing a two-dimensional décor;

generating a three-dimensional surface relief by digitally embossing, in register with the two-dimensional décor, wherein the three-dimensional surface relief is generated at a distance of at least 0.1 mm from the décor layer by applying a transparent or at least translucent spacer layer against the décor layer, the spacer layer having a thickness that remains unmodified by the digital embossing and that corresponds to said distance, wherein the three-dimensional surface relief is generated in one or more coating layers on a side of the spacer layer facing away from the décor layer after application of the spacer layer against the décor layer.

2. The method as claimed in claim 1, wherein the thickness of the spacer layer and said distance amount to 0.15 mm or more.

3. The method as claimed in claim 1, wherein the spacer layer is laminated with the structural core carrying the décor layer prior to three-dimensional surface relief generation.

4. The method as claimed in claim 1, wherein the spacer layer is produced, at least in part, by coating the structural core with a plastisol, which said plastisol is thereafter solidified.

5. The method as claimed in claim 1, wherein the spacer layer is attached to the structural core carrying the décor layer with at least one of hot melt glue, heat-sensitive glue and pressure-sensitive glue.

6. The method as claimed in claim 1, wherein the spacer layer comprises a polyethylene terephthalate polymer, a polyethylene polymer, a polypropylene polymer, or a polyvinyl chloride polymer.

7. The method as claimed in claim 1, wherein the structural core comprises a printable surface and wherein the method includes digitally printing the décor layer onto the printable surface of the structural core prior to application of the spacer layer against the décor layer.

8. The method as claimed in claim 1, wherein individual slabs of the structural core are provided and wherein the digital embossing is carried out slab by slab, registration of the three-dimensional surface relief with the two-dimensional décor being effected by taking registration marks or one or more borders of the slabs or both registration marks and one or more borders of the slabs as references.

9. The method as claimed in claim 1, wherein the digital embossing includes:

applying a coating layer on the side of the spacer layer facing away from the décor layer, providing a negative of at least part of the three-dimensional surface relief by digital 3D printing of an embossing tool, pressing the 3D-printed embossing tool against the coating layer so as to form therein at least said part of the three-dimensional surface relief, and fixing the three-dimensional surface relief in the coating layer.

10. The method as claimed in claim 1, wherein the digital embossing includes:

applying a thickness-modulated coating on the side of the spacer layer facing away from the décor layer by digital additive 3D printing.

11. The method as claimed in claim 1, wherein the digital embossing includes:

applying a coating layer on the side of the spacer layer facing away from the décor layer, applying an inhibiting agent in a pattern onto, into or below the coating layer by digital printing, solidifying the coating layer, the inhibiting agent inhibiting the solidification in said pattern, and removing unsolidified parts of the coating layer.

12. The method as claimed in claim 1, wherein the digital embossing includes:

applying a coating layer on the side of the spacer layer facing away from the décor layer, applying a coating-repellent agent, into or below the coating layer by digital printing so as to create in said coating layer a pattern, solidifying the coating layer, and removing the coating-repellent agent.

13. The method as claimed in claim 1, further including:

generating a three-dimensional surface relief file by calculating a three-dimensional surface relief based on a determined décor type, lineal and areal features of the two-dimensional décor, and said distance, said three-dimensional surface relief file defining at least one of raised and lowered areas with respect to a reference level, the reference level being coincident with the side of the spacer layer facing away from the décor layer or separated therefrom by a known spacing;

providing the 3D surface texture file to a digital embossing equipment carrying out the digital embossing, the digital embossing equipment interpreting the 3D surface texture file and carrying out the digitally embossing in accordance with the 3D surface texture file.

14. A method for producing a decorative surface covering, the decorative surface covering comprising flooring or wall-covering, the method comprising:

providing a structural core, including one or more core layers, the structural core comprising a printable surface;

digitally printing a décor layer onto the printable surface of the structural core, the décor layer representing a two-dimensional décor applying a transparent or at least translucent spacer layer against the décor layer, after digital printing of the digitally printing of the décor layer, the spacer layer having a thickness of at least 0.1 mm;

generating a three-dimensional surface relief by digitally embossing, in register with the two-dimensional décor, wherein the three-dimensional surface relief is generated at a distance of at least 0.1 mm from the décor layer by maintaining the thickness of the spacer layer unmodified by the digital embossing, wherein the three-dimensional surface relief is generated in one or more coating layers on a side of the spacer layer facing away from the décor layer after application of the spacer layer against the décor layer;

wherein the digital embossing includes:

applying a coating layer on the side of the spacer layer facing away from the décor layer, applying an inhibiting agent in a pattern onto, into or below the coating layer by digital printing, solidifying the coating layer, the inhibiting agent inhibiting the solidification in said pattern, and removing unsolidified parts of the coating layer.

15. The method as claimed in claim 14, wherein the thickness of the spacer layer amounts to 0.15 mm or more.

16. The method as claimed in claim 14, wherein the spacer layer is laminated with the structural core carrying the décor layer prior to three-dimensional surface relief generation, the spacer layer being attached to the structural core carrying the décor layer with at least one of hot melt glue, heat-sensitive glue and pressure-sensitive glue.

17. The method as claimed in claim 14, wherein the spacer layer is produced, at least in part, by coating the structural core with a plastisol, which said plastisol is thereafter solidified.

18. The method as claimed in claim 14, wherein the spacer layer comprises a polyethylene terephthalate polymer, a polyethylene polymer, a polypropylene polymer, or a polyvinyl chloride polymer.

19. The method as claimed in claim 14, wherein individual slabs of the structural core are provided and wherein the digital embossing is carried out slab by slab, registration of the three-dimensional surface relief with the two-dimensional décor being effected by taking registration marks or one or more borders of the slabs or both registration marks and one or more borders of the slabs as references.

20. The method as claimed in claim 14, further including:

generating a three-dimensional surface relief file by calculating a three-dimensional surface relief based on a determined décor type, lineal and areal features of the two-dimensional décor, and said distance, said three-dimensional surface relief file defining at least one of raised and lowered areas with respect to a reference level, the reference level being coincident with the side of the spacer layer facing away from the décor layer or separated therefrom by a known spacing;

providing the 3D surface texture file to a digital embossing equipment carrying out the digital embossing, the digital embossing equipment interpreting the 3D surface texture file and carrying out the digitally embossing in accordance with the 3D surface texture file.

* * * * *